United States Patent
Bhatt et al.

(10) Patent No.: US 9,177,554 B2
(45) Date of Patent: Nov. 3, 2015

(54) TIME-BASED SENTIMENT ANALYSIS FOR PRODUCT AND SERVICE FEATURES

(71) Applicant: International Business Machines Corporation, Armonk, NY (US)

(72) Inventors: Dhruv A. Bhatt, Indian Trail, NC (US); Kristin E. McNeil, Charlotte, NC (US); Nitaben A. Patel, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 13/758,560

(22) Filed: Feb. 4, 2013

(65) Prior Publication Data

US 2014/0219571 A1   Aug. 7, 2014

(51) Int. Cl.
| | |
|---|---|
| *G06K 9/72* | (2006.01) |
| *G10L 15/26* | (2006.01) |
| *G06Q 30/00* | (2012.01) |
| *G06F 17/30* | (2006.01) |

(52) U.S. Cl.
CPC ............ *G10L 15/26* (2013.01); *G06F 17/30722* (2013.01); *G06K 9/72* (2013.01); *G06Q 30/00* (2013.01)

(58) Field of Classification Search
CPC ..................... G06Q 10/06395; G06Q 30/0251; G06Q 30/0282; G06Q 30/0201; G06Q 10/063; G06Q 30/0217; G06Q 30/0269; G06Q 30/02; G06F 17/2785; G06F 17/21; G06F 17/30253; G06F 17/30675; G06F 17/30731; G06F 17/30259; G06F 17/30011; G06F 17/3053; G06F 17/30696; H04W 4/206; G08B 13/19656; G08B 13/19673; G06K 9/72

USPC .......... 382/209, 224, 229, 305; 707/608, 706, 707/730, 748; 704/10, 9, 1

See application file for complete search history.

(56) References Cited

U.S. PATENT DOCUMENTS

| | | | |
|---|---|---|---|
| 7,788,086 B2 | 8/2010 | Corston-Oliver et al. | |
| 7,895,149 B2 | 2/2011 | Merugu et al. | |
| 7,974,983 B2 | 7/2011 | Goeldi | |
| 8,135,669 B2 | 3/2012 | Olstad et al. | |
| 8,417,713 B1 * | 4/2013 | Blair-Goldensohn et al. | 707/751 |
| 8,515,828 B1 * | 8/2013 | Wolf et al. | 705/26.7 |
| 8,699,824 B2 * | 4/2014 | Cheng et al. | 382/305 |
| 8,781,102 B2 * | 7/2014 | Conway et al. | 379/265.06 |

(Continued)

OTHER PUBLICATIONS

Hao, et al., Integrating sentiment analysis and term associations with geo-temporal visualizations on customer feedback streams, Proceedings of the SPIE-The Intl Society of Optical Engineering, vol. 8294, pp. 82940H (12 pp.), DOI: 10.1117/12.912202, Jan. 7, 2012.

(Continued)

*Primary Examiner* — Vu Le
*Assistant Examiner* — Aklilu Woldemariam
(74) *Attorney, Agent, or Firm* — Janaki K. Davda; Konrad, Raynes, Davda & Victor LLP (57) ABSTRACT

Provided are a method, computer program product and system for reporting time-based sentiment for a product. Text analysis is performed on at least one communication. At least one feature for the product is determined based on the text analysis. A sentiment value is generated for the at least one feature for the product. A date associated with the sentiment value is determined, and the sentiment value is reported for at least one feature over time.

18 Claims, 6 Drawing Sheets

(56) References Cited

U.S. PATENT DOCUMENTS

| | | |
|---|---|---|
| 2008/0215543 A1 | 9/2008 | Huang et al. |
| 2008/0249764 A1* | 10/2008 | Huang et al. ................. 704/9 |
| 2008/0270116 A1* | 10/2008 | Godbole et al. .............. 704/9 |
| 2009/0106697 A1 | 4/2009 | Ward et al. |
| 2009/0119157 A1 | 5/2009 | Dulepet |
| 2009/0216524 A1* | 8/2009 | Skubacz et al. .............. 704/9 |
| 2009/0306967 A1 | 12/2009 | Nicolov et al. |
| 2009/0319342 A1 | 12/2009 | Shilman et al. |
| 2010/0049590 A1 | 2/2010 | Anashul |
| 2010/0119053 A1* | 5/2010 | Goeldi .................. 379/265.09 |
| 2010/0121707 A1* | 5/2010 | Goeldi ...................... 705/14.49 |
| 2010/0121849 A1* | 5/2010 | Goeldi ......................... 707/736 |
| 2010/0145719 A1* | 6/2010 | Williams et al. .............. 705/2 |
| 2010/0306123 A1* | 12/2010 | Cai et al. ...................... 705/347 |
| 2011/0004483 A1 | 1/2011 | Ting et al. |
| 2011/0078157 A1 | 3/2011 | Sun et al. |
| 2011/0078167 A1 | 3/2011 | Sundaresan et al. |
| 2011/0137906 A1* | 6/2011 | Cai et al. ...................... 707/740 |
| 2011/0225174 A1* | 9/2011 | Artzt et al. ..................... 707/750 |
| 2011/0246463 A1 | 10/2011 | Carson, Jr. et al. |
| 2011/0249811 A1* | 10/2011 | Conway et al. ............ 379/88.01 |
| 2011/0276513 A1* | 11/2011 | Erhart et al. .................. 705/347 |
| 2011/0307312 A1* | 12/2011 | Goeldi ......................... 705/14.6 |
| 2012/0047174 A1* | 2/2012 | Avner et al. ................... 707/777 |
| 2012/0179752 A1 | 7/2012 | Mosley et al. |
| 2014/0136185 A1* | 5/2014 | Bhatt .............................. 704/9 |

OTHER PUBLICATIONS

Tsytsarau, et al>, Survey on mining subjective data on the web, Data Mining and Knowledge Discovery, v 24, n 3, p. 478-514, May 2012, DOI: 10.1007/s10618-011-0238-6.

Bhatt, Sentiment Analysis Based on Demographic Analysis, U.S. Appl. No. 13/675,653, filed Nov. 13, 2012.

Fink, et al., Real-time Sentiment Analysis for Synchronous Communication, U.S. Appl. No. 13/728,898, filed Dec. 27, 2012.

* cited by examiner

TIME-BASED SENTIMENT ANALYSIS FOR PRODUCT AND SERVICE FEATURES

BACKGROUND OF THE INVENTION

The present invention relates generally to systems and methods for analyzing user generated content such as reviews and comments of goods and services with text analytics, and in particular sentiment analysis of a product or service feature over a period of time.

The use of the Internet, and in particular social media, provides real time rapid communication (positive or negative) that can almost immediately affect the brand image for the product or service. Product surveys provide one way to gauge customer sentiment regarding a product in general and in specific certain features about the product. Developing questionnaires and soliciting responses from customers is expensive and slow. Consumers, as well as business owners, want to know customer satisfaction regarding specific features of a product or service without performing surveys.

SUMMARY

Provided are a method, computer program product and system for reporting time-based sentiment for a product. Text analysis is performed on at least one communication. At least one feature for the product is determined based on the text analysis. A sentiment value is generated for the at least one feature for the product. A date associated with the sentiment value is determined, and the sentiment value is reported for at least one feature over time.

BRIEF DESCRIPTION OF THE SEVERAL VIEWS OF THE DRAWINGS

FIG. 2 is a flowchart depicting a process for generating a report of time-based sentiment by product by feature. FIG. 2 is formed by FIG. 2A and FIG. 2B.

DETAILED DESCRIPTION

In the following description, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Businesses have an interest in obtaining customer feedback relevant to their products, services, or business (hereinafter products will refer to products and services). Customers frequently provide product feedback (facts and opinions concerning the product) as a communication using email, blogs, retail web sites, and social media sites. Communications expressing general feedback are useful, but often inadequate to understand customer satisfaction with product features. Performing time-based analysis of communications that are specific to a product feature may provide insight to changing customer sentiment about a product feature.

Businesses need rapid feedback on customer sentiment relevant to product feature changes; taking rapid action to remedy a poor sentiment is necessary for sales and warranty costs. Further, businesses need to know how that sentiment affected the overall sentiment of the product (and possibly the sentiment towards the business). Alternatively, consumers would like a report of customer sentiment of each feature of a product over time. For example, a consumer interested in purchasing a particular automobile model would like to know consumer sentiment relevant to the automobile features (e.g., air-conditioning, power windows, brakes, and transmission). Additionally the consumer desires a time-based report of the sentiment for each feature to determine how the sentiment changed with each model year, or changes within a model year.

In another example, MyBiz produces a refrigerator at a lower cost point than competing refrigerators. Many customers communicated in blogs, over a year ago, that the MyBiz refrigerator has a noisy icemaker. In recent blog posts, there is no mention of a noisy icemaker. A time-based sentiment report by feature for the refrigerator would show the change in sentiment over time for features of the MyBiz refrigerator; the icemaker feature would show a positive change in sentiment. MyBiz can monitor this report periodically to identify negative change in sentiment and take appropriate corrective actions.

Figure 1:
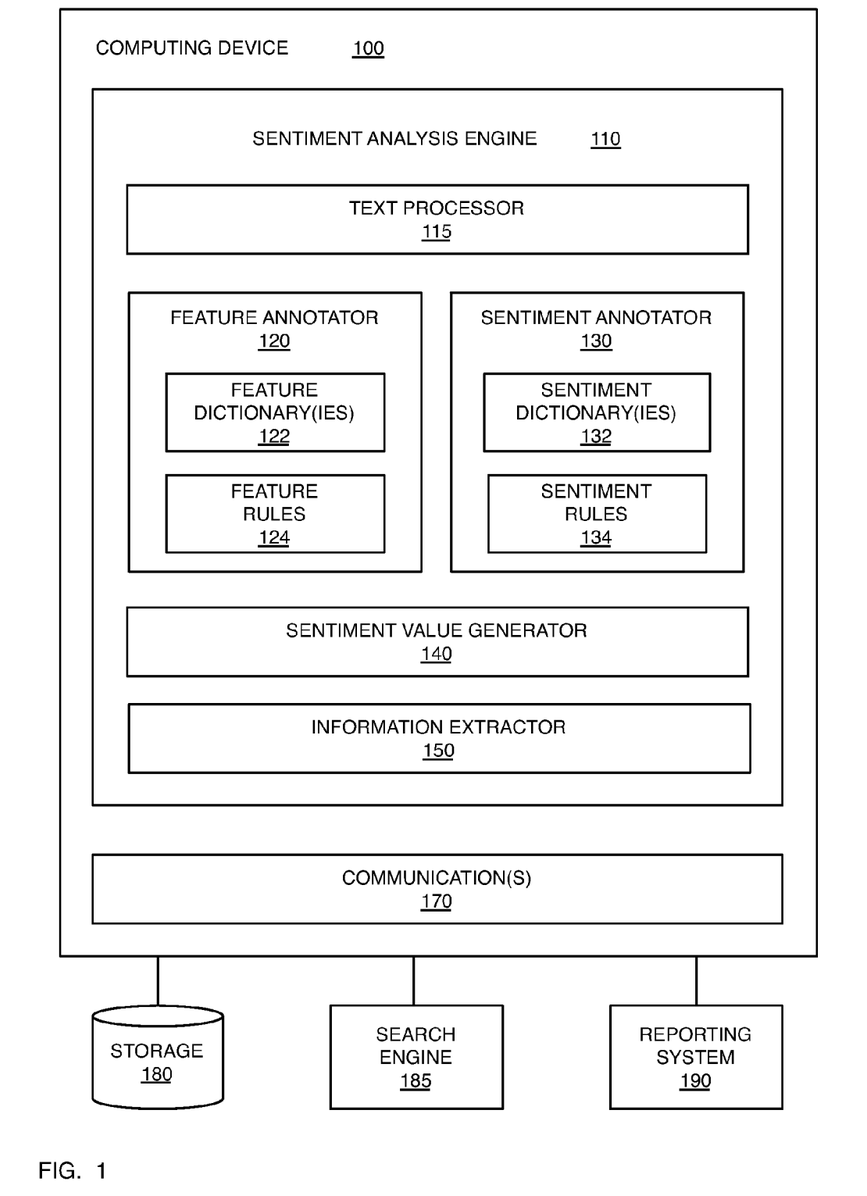
FIG. 1 illustrates a computing architecture in accordance with certain embodiments.

FIG. 1 illustrates a computing architecture in accordance with certain embodiments. In FIG. 1, a computing device 100 includes a sentiment analysis engine 110, and one or more communications 170. The computing device 100 is coupled to a storage 180, a search engine 185, and a reporting system 190. In an embodiment, the storage 180 is a database. The sentiment analysis engine 110 includes a text processor 115, a feature annotator 120, sentiment annotator 130, sentiment value generator 140, and information extractor 150. In an embodiment, the sentiment analysis engine 110 is configured to use a particular storage 180, a particular search engine 185, and a particular reporting system 190.

Communications 170 includes (but is not limited to), for example, blog postings, comments, chat sessions, articles, podcasts, videos, and audio. In an embodiment, text processor 115 converts communications 170 not already in text form to text. The information extractor 150, in certain embodiments, extracts metadata from the communications 170. Metadata, for example, includes communication language, author, date, and communication format. In certain embodiments, the text processor 115 may convert communications 170 to a common language based on the metadata extracted with the information extractor 150. In certain embodiments, the text processor 115 processes communication 170 and generates a tokenized communication based on the language of the communication 170.

Feature annotator 120 includes at least one feature dictionary 122, and at least one set of feature rules 124. The feature annotator creates feature annotations from the communications 170 based on the feature dictionary 122 and feature rules 124. In an embodiment, each product evaluated has a separate feature dictionary 122 and feature rules 124 relevant for the product features. Each feature dictionary 122 contains the word and phrase variations to describe each product feature. In an embodiment, the feature annotations are stored in storage 180.

Sentiment annotator 130 includes at least one sentiment dictionary 132 and at least one set of sentiment rules 134. The sentiment annotator 130 creates sentiment annotations for the communications 170. Sentiment may be described as an attitude of a user (e.g., a speaker or writer) with respect to a feature of the product. In an embodiment, positive sentiment is represented as +1, neutral as 0, and negative sentiment as −1. In another embodiment, sentiment is provided in a scale from one to five with one being very bad and five being very good. Sentiment value generator 140, provides the weighting function if more than one sentiment is represented in a communication 170 about a feature. For example, if a feature has three very strong positive sentiment annotations (each with a sentiment value of five) and one sentiment value of one, a sentiment value of four is generated. In another embodiment, the sentiment value generator 140 filters out communications that are duplicates of communications previously evaluated and advertisement communications. In certain other embodiments, the sentiment value generator 140 filters out communications from a configured list of individuals (e.g., individuals known to have a vested interest in the product being evaluated). The information extractor 150 extracts information from a communication 170 such as the date connected to the communication 170.

The sentiment analysis engine 110 combines each feature annotation with an associated sentiment annotation and sentiment value, together with metadata and date information to generate a record in storage 180. The reporting system 190 generates a report of results. In an embodiment, standard business reporting software is configured to work with the data in storage 180 to generate appropriate graphic results of product features, and associated sentiment by date range.

Figure 2A:
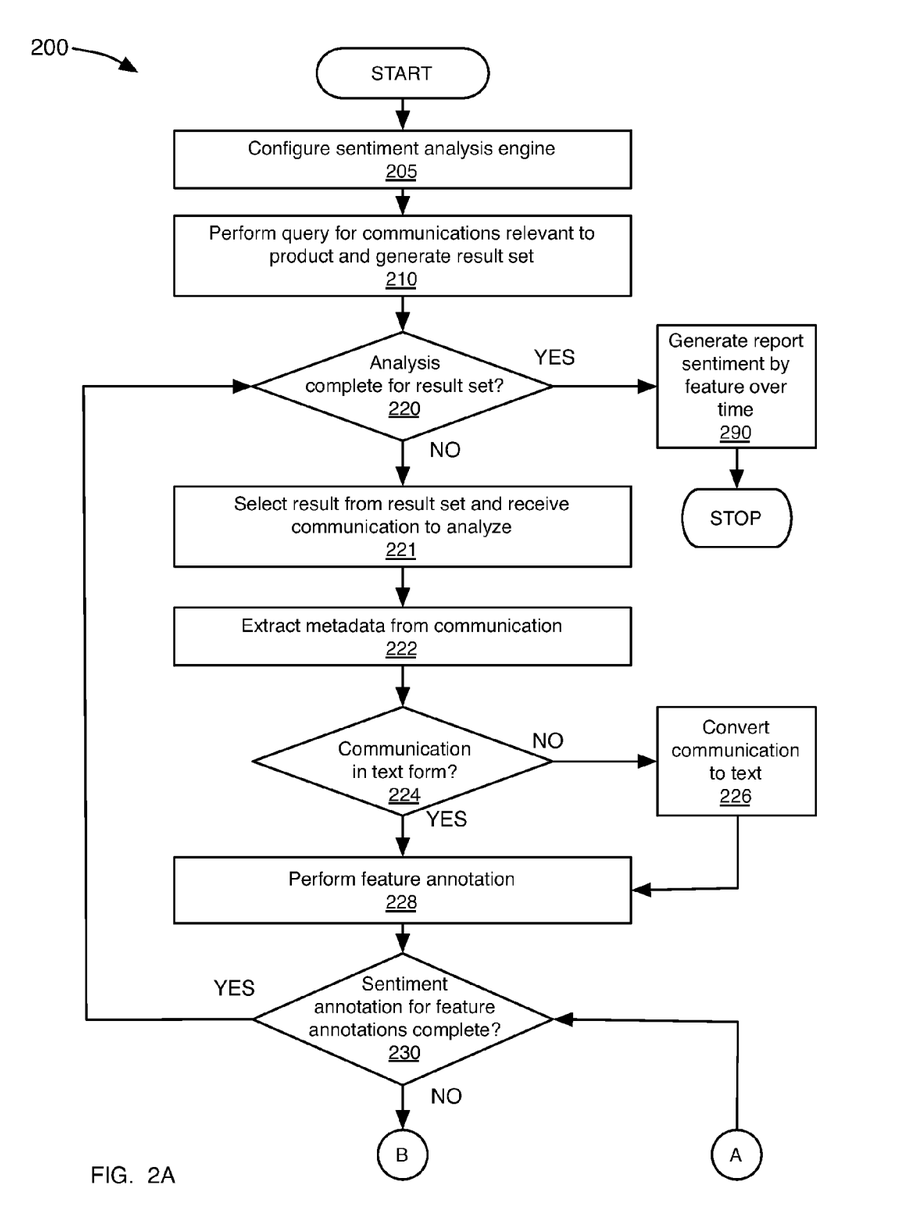
Figure 2B:
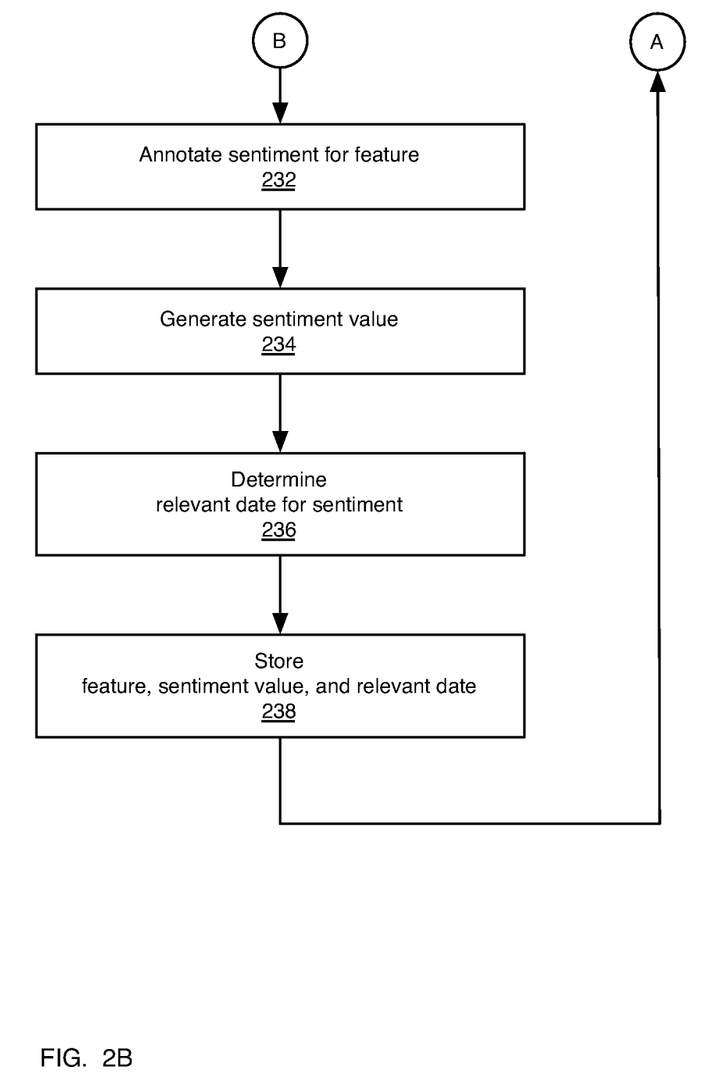

FIG. 2 is a flowchart depicting a process 200 for generating a report of time-based sentiment by product by feature. FIG. 2 is formed by FIG. 2A and FIG. 2B. As shown, process begins at step 205 wherein the sentiment analysis engine 110 is configured. In an embodiment, the sentiment analysis engine 110 is configured to specify the product and features of interest, the storage 180, the search engine 185, and the reporting system 190. In certain embodiments, the configuration includes specifying the product search parameters for the search engine 185, the locations to search for with search engine 185, the feature specific dictionaries 122, the feature specific rules 124, the sentiment specific dictionaries 132, and the sentiment specific rules 134. In certain embodiments, the sentiment analysis engine 110 is configured to load the appropriate feature dictionaries 122 and feature rules 124 based on recognition of the product provided in the configuration. For example, if features for "MyBiz refrigerator" and "Competitive refrigerator" are to be reported, at least one feature dictionary 122 and set of feature rules 124 for "MyBiz refrigerator" and at least one feature dictionary 122 and set of feature rules 124 for "Competitive refrigerator" are loaded in step 205 as part of the configuration. The sentiment rules 134 in this example are common for both products and a single sentiment dictionary 132 and sentiment rule set 134 is configured and loaded in step 205.

At step 210, the search engine 185 performs a query for communications. At step 210, the search engine 185 performs a search of communications relevant to the configured product(s) of interest and generates a result set. In an embodiment, each result in the result set is a Uniform Resource Location (URL) to a communication. For example, in certain embodiments, sentiment analysis engine 110 is configured to provide a time-based sentiment report by feature for "MyBiz refrigerator" and "Competitive refrigerator." The search parameters would include search strings to provide an Internet search engine for finding all the relevant postings for "MyBiz refrigerator" and "Competitive refrigerator."

As is shown, step 220 determines whether the analysis of all entries in the result set is complete; if all entries in the result set have been analyzed processing continues to step 290 where the sentiment report is generated by feature over time. If all entries in the result have not been analyzed then processing continues to step 221. In an embodiment, at step 290 uses reporting system 190 to generate a time-based sentiment analysis report by product and feature. In certain embodiments, the reporting system 190 may be configured to provide custom reports on a period basis.

At step 221, a result from the result set is removed from the result set and the result is used to receive a communication 170. In an embodiment, the result is a URL and the communication 170 is downloaded from the URL. For example, the URL for an audio review of "MyBiz refrigerator" is used to download the audio file located at the URL. As is shown, step 222 extracts metadata from the communication 170. In an embodiment, information extractor 150 reads the header information of the file to extract the metadata and determine the product (or products) related to the communication 170. In certain other embodiment, the information extractor 150 analyzes the header information found at the URL to extract the metadata. For example, communication 170 contains an audio file review of "MyBiz refrigerator." In an embodiment, information extractor 150 examines the audio file header to extract the language, title, product, author, bitrate, and other metadata. In certain other embodiments, the information extractor 150 parses textual communication 170 to extract relevant metadata At step 224, a determination is made as to whether the communication 170 is textual. If the communication is textual processing continues to step 228, otherwise processing continues to step 226. At step 226, audio communication 170 is converted to text. In an embodiment, text processor 115 is configured with the extracted metadata, and converts audio communication 170 to text using a speech recognition engine (not shown). For example, communication 170 containing an audio file review of "MyBiz refrigerator" is converted to text, and replaced with a text file generated by a speech recognition engine.

Processing continues with step 228 where feature annotation is performed. In an embodiment, feature annotator 120 uses feature dictionary 124 and feature rules 124 to annotate features in communication 170 and store the annotations in storage 180. In certain embodiments, all dictionaries for all products are used to annotate features. For example, using the feature dictionaries 122 and feature rules 124 for "MyBiz refrigerator" annotations are generated for the "MyBiz refrigerator" features, and similarly, feature dictionaries 122 and feature rules 124 for "Competitive refrigerator" are used to generate annotations for features related to "Competitive refrigerator" in communication 170. In certain embodiments (not shown) a separate feature annotation step is performed for each configured product and steps 228 through steps 238 are performed separately for each configured product.

As shown, step 230 determines whether sentiment annotations for feature annotations for communication 170 are complete, and if so processing continues to step 220, otherwise processing continues to step 232. As shown, step 232 annotates sentiment for each feature found in communication 170. In an embodiment, sentiment annotator 130 uses sentiment dictionaries 132 and sentiment rules 134 to annotate the sentiment. The sentiment dictionaries 132 provide the words associated with sentiment, and the sentiment rules 134 are used to determine the sentiment strength. In an embodiment, the word "excellent" would indicate a strong positive, and the word "poor" would indicate negative sentiment.

Processing continues with step 234, where a sentiment value is generated. In an embodiment, multiple sentiments concerning a feature are combined to generate a single sentiment value using sentiment generator 140. In certain embodiments, sentiment value is filtered out of the analysis if the communication 170 is a duplicate of a previously evaluated communication. In certain other embodiments, sentiment value is filtered out of the analysis if the communication 170 is an advertisement, or written by an interest party to the product. In certain embodiments, a list of authors to exclude from analysis is provided and communications 170 from such authors are filtered from the analysis.

As shown, step 236 determines the relevant date for the sentiment. In an embodiment, the information extractor 150 determines whether the communication 170 includes the relevant purchase date for the feature; if so the relevant purchase date is used, otherwise the communication date for communication 170 is used. As shown, step 238 stores the feature, sentiment value, relevant date, and other metadata extract in storage 180. Processing continues to step 230. As described above, once all the results in the result set have been analyzed step 220 continues to step 290, and after step 290 process, 200 is complete.

The vast number of Internet sites accepting communications about products has established a sufficient corpus for time-based product feature sentiment analysis, however manually sifting through communications to find sentiment about each product feature over time is impracticable. Thus, embodiments disclosed herein provide time based reporting of customer sentiment of product features. The reports enable rapid understanding of customer sentiment about product features over time. The embodiments take communications of various types and formats and analyze each for product features and sentiments. The subjective sentiment communications are normalized to a standard sentiment scale so the sentiment is evaluated in an objective manner. In certain embodiments, the product date is used for time based analysis, thereby enabling a business to evaluate the effect of product modifications on customer sentiment. Advantageously, various forms of communication (audio, video, text) are analyzed and included in the sentiment analysis.

Cloud Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 3:
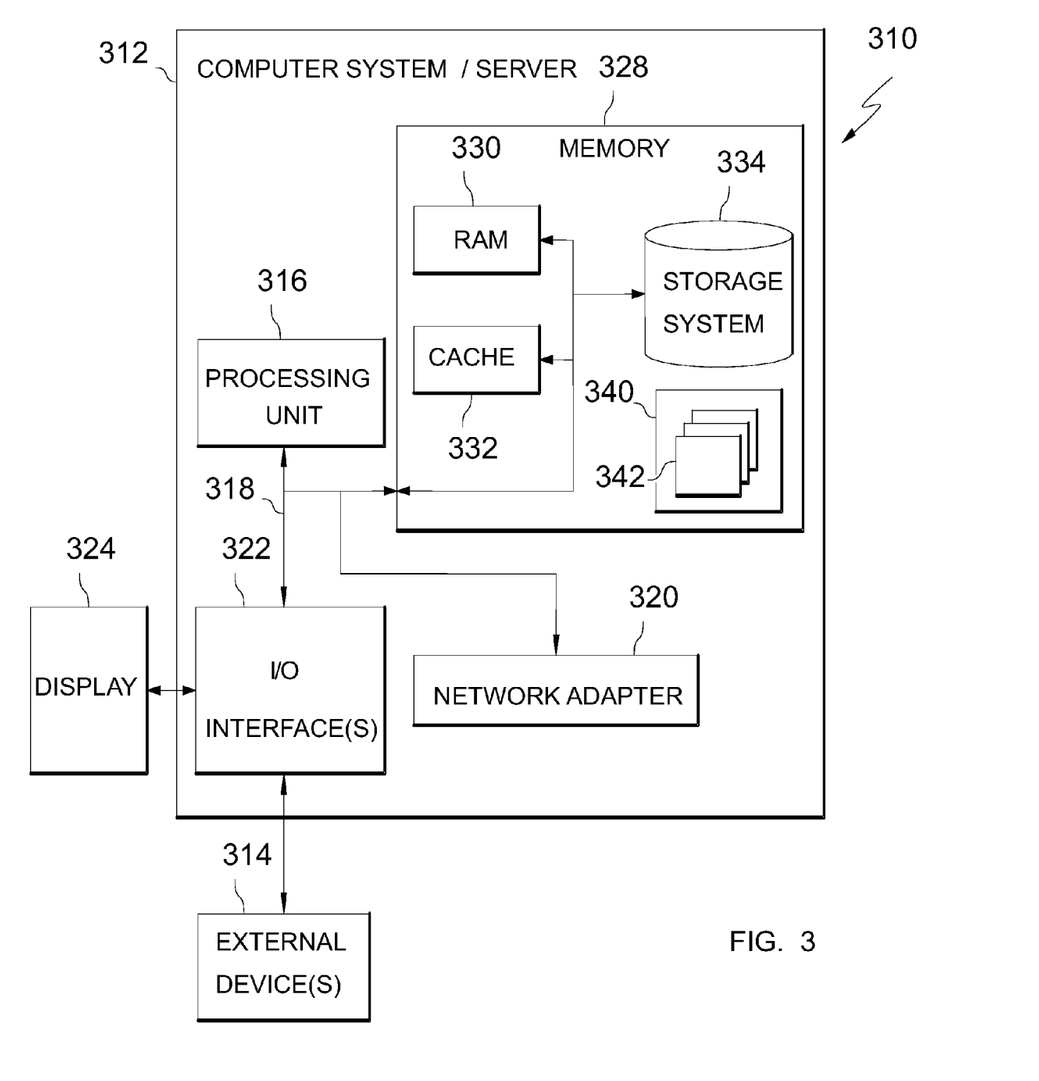
FIG. 3 depicts a cloud computing node in accordance with certain embodiments.

Referring now to FIG. 3, a schematic of an example of a cloud computing node is shown. Cloud computing node 310 is only one example of a suitable cloud computing node and is not intended to suggest any limitation as to the scope of use or functionality of embodiments of the invention described herein. Regardless, cloud computing node 310 is capable of being implemented and/or performing any of the functionality set forth hereinabove.

In cloud computing node 310 there is a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communication network. In a distributed cloud computing environment, program modules may be located in both local and remote computer system storage media including memory storage devices.

As shown in FIG. 3, computer system/server 312 in cloud computing node 310 is shown in the form of a general-purpose computing device. The components of computer system/server 312 may include, but are not limited to, one or more processors or processing units 316, a system memory 328, and a bus 318 that couples various system components including system memory 328 to a processor or processing unit 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 312 typically includes a variety of computer system readable media. Such media may be any available media that is accessible by computer system/server 312, and it includes both volatile and non-volatile media, removable and non-removable media.

System memory 328 can include computer system readable media in the form of volatile memory, such as random access memory (RAM) 330 and/or cache memory 332. Computer system/server 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication 320 can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

Figure 4:
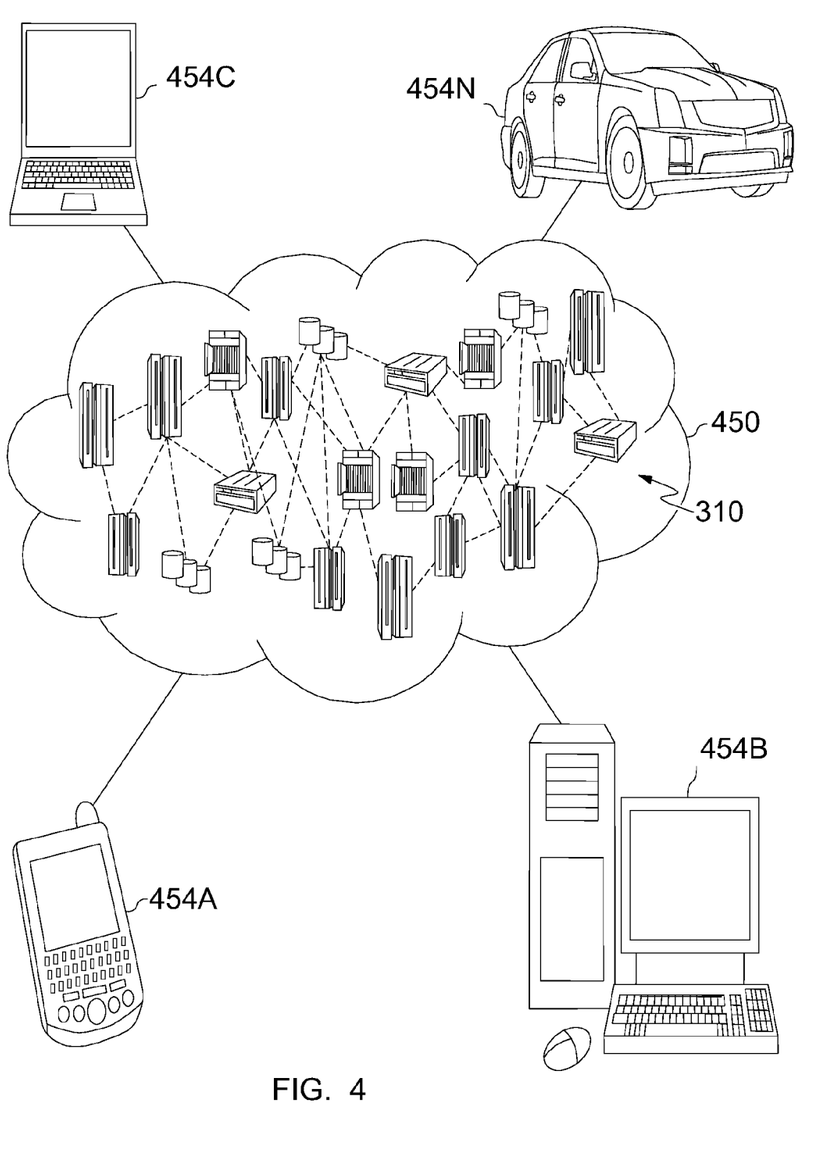
FIG. 4 depicts a cloud computing environment in accordance with certain embodiments.

Referring now to FIG. 4, illustrative cloud computing environment 450 is depicted. As shown, cloud computing environment 450 comprises one or more cloud computing nodes 310 with which local computing devices used by cloud consumers, such as, for example, personal digital assistant (PDA) or cellular telephone 454A, desktop computer 454B, laptop computer 454C, and/or automobile computer system 454N may communicate. Nodes 310 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 310 and cloud computing environment 450 can communicate with any type of computerized device over any type of network and/or network addressable connection (e.g., using a web browser).

Figure 5:
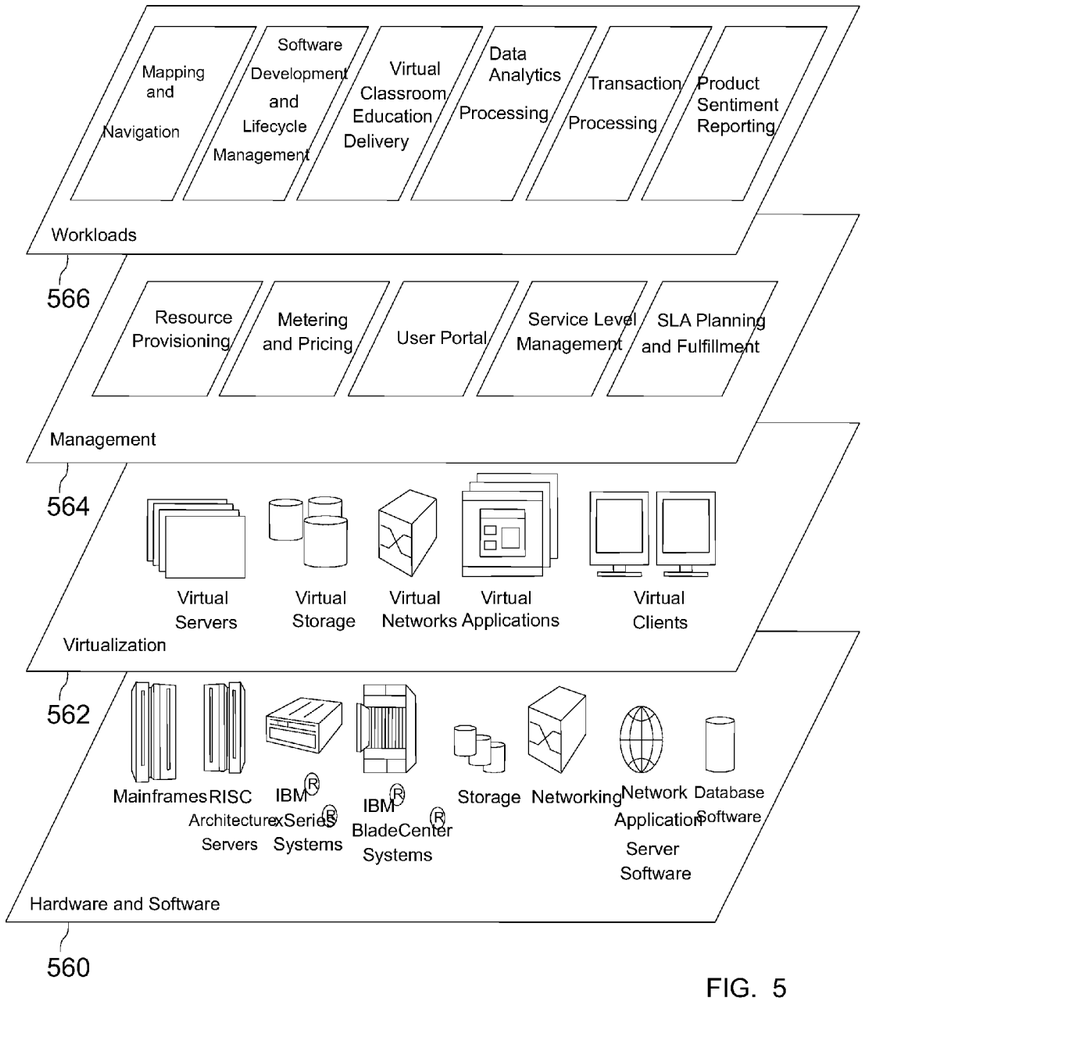
FIG. 5 depicts abstraction model layers in accordance with certain embodiments.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 562 provides an abstraction layer from which the following examples of virtual entities may be provided: virtual servers; virtual storage; virtual networks, including virtual private networks; virtual applications and operating systems; and virtual clients.

In one example, management layer 564 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 566 provides examples of functionality for which the cloud computing environment may be utilized. Examples of workloads and functions which may be provided from this layer include: mapping and navigation; software development and lifecycle management; virtual classroom education delivery; data analytics processing; transaction processing; and sentiment analysis.

Thus, in certain embodiments, software or a program, implementing sentiment analysis in accordance with embodiments described herein, is provided as a service in a cloud environment.

In certain embodiments, the computing device 100 has the architecture of computing node 310. In certain embodiments, the computing device 100 is part of a cloud environment. In certain alternative embodiments, the computing device 100 is not part of a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

What is claimed is:

1. A computer implemented method for reporting sentiment of a product, comprising:
   performing a text analysis on communications, by at least one computing processor;
   determining at least one feature for the product based on the text analysis, by the at least one computing processor;
   generating sentiment values using the communications for the at least one feature for the product based on a sentiment dictionary and sentiment rules that determine a sentiment strength, by the at least one computing processor;
   determining a date associated with each of the sentiment values by extracting the date from the communications, by the at least one computing processor;
   for each date associated with each of the sentiment values, recording a feature annotation, a sentiment annotation, the sentiment value, metadata, and the date, wherein the feature annotation is generated using a feature dictionary and feature rules, and wherein the sentiment annotation is generated using the sentiment dictionary and the sentiment rules, by the at least one computing processor; and
   reporting how the sentiment values changed over time based on each date, by the at least one computing processor.

2. The method of claim 1, wherein generating a sentiment value from the sentiment values includes determining at least one sentiment for the at least one feature based on the text analysis.

3. The method of claim 1, wherein the product is a service.

4. The method of claim 1, further comprising:
   identifying an audio communication; and
   converting the audio communication to text.

5. The method of claim 1, wherein each date is selected from:
   a purchase date; and
   a communication date.

6. The method of claim 2, wherein generating the sentiment value includes combining a plurality of sentiments for the at least one feature.

7. A system for reporting sentiment of a product, comprising:
   a processor; and
   a storage device connected to the processor, wherein the storage device has stored thereon a program, wherein the processor is configured to execute instructions of the program to perform operations, and wherein the operations comprise:
   performing a text analysis on communications;
   determining at least one feature for the product based on the text analysis;
   generating the sentiment values using the communications for the at least one feature for the product based on a sentiment dictionary and sentiment rules that determine a sentiment strength;
   determining a date associated with each of the sentiment values by extracting the date from the communications;
   for each date associated with each of the sentiment values, recording a feature annotation, a sentiment annotation, the sentiment value, metadata, and the date, wherein the feature annotation is generated using a feature dictionary and feature rules, and wherein the sentiment annotation is generated using the sentiment dictionary and the sentiment rules; and
   reporting how the sentiment values changed over time based on each date.

8. The system of claim 7, wherein the operation of generating a sentiment value from the sentiment values includes determining at least one sentiment for the at least one feature based on the text analysis.

9. The system of claim 7, wherein the product is a service.

10. The system of claim 7, wherein the operations further comprise:
    identifying an audio communication; and
    converting the audio communication to text.

11. The system of claim 7, wherein each date is selected from:
    purchase date; and
    a communication date.

12. The system of claim 8, wherein the operation of generating the sentiment value includes combining a plurality of sentiments for the at least one feature.

13. A computer program product for reporting sentiment of a product, the computer program product comprising:
    a computer readable storage medium having computer readable program code embodied therewith, the computer readable program code, executable by at least one processor of a computer is configured to perform:
    performing a text analysis on communications;
    determining at least one feature for the product based on the text analysis;
    generating the sentiment values using the communications for the at least one feature for the product based on a sentiment dictionary and sentiment rules that determine a sentiment strength;
    determining a date associated with each of the sentiment values by extracting the date from the communications;
    for each date associated with each of the sentiment values, recording a feature annotation, a sentiment annotation, the sentiment value, metadata, and the date, wherein the feature annotation is generated using a feature dictionary and feature rules, and wherein the sentiment annotation is generated using the sentiment dictionary and the sentiment rules; and
    reporting how the sentiment values changed over time based on each date.

14. The computer program product of claim 13, wherein the computer readable program code generating a sentiment value from the sentiment values is configured to include determining at least one sentiment for the at least one feature based on the text analysis.

15. The computer program product of claim 13, wherein the product is a service.

16. The computer program product of claim 13, wherein the computer readable program code, executable by the at least one processor of the computer, is configured to perform:
    identifying an audio communication; and
    converting the audio communication to text.

17. The computer program product of claim 13, wherein each date is selected from:
    a purchase date; and
    a communication date.

18. The computer program product of claim 14, wherein the computer readable program code generating the sentiment value is configured to include combining a plurality of sentiments for the at least one feature.

* * * * *